US007900088B1

(12) United States Patent
Pawar et al.

(10) Patent No.: US 7,900,088 B1
(45) Date of Patent: Mar. 1, 2011

(54) SYSTEM FOR PERFORMING INCREMENTAL FILE SYSTEM CHECK

(75) Inventors: Sitarm Pawar, Shrewsbury, MA (US); Sachin Mullick, Natick, MA (US); Jiannan Zheng, Sammamish, WA (US)

(73) Assignee: EMC Corporation, Hopkinton, MA (US)

( * ) Notice: Subject to any disclaimer, the term of this patent is extended or adjusted under 35 U.S.C. 154(b) by 994 days.

(21) Appl. No.: 11/537,028

(22) Filed: Sep. 29, 2006

(51) Int. Cl.
*G06F 17/30* (2006.01)
(52) U.S. Cl. .......................... 714/21; 714/15; 711/162
(58) Field of Classification Search ............... 714/15, 714/21
See application file for complete search history.

(56) References Cited

U.S. PATENT DOCUMENTS

| | | | | |
|---|---|---|---|---|
| 5,778,168 | A * | 7/1998 | Fuller | 714/18 |
| 6,374,268 | B1 * | 4/2002 | Testardi | 707/205 |
| 6,981,114 | B1 * | 12/2005 | Wu et al. | 711/162 |
| 7,028,154 | B2 * | 4/2006 | Reeves | 711/162 |
| 7,269,706 | B2 * | 9/2007 | Agarwal et al. | 711/173 |
| 7,386,559 | B1 * | 6/2008 | Desai et al. | 1/1 |
| 7,546,319 | B1 * | 6/2009 | Srinivasan et al. | 1/1 |
| 2003/0182389 | A1 * | 9/2003 | Edwards | 709/213 |
| 2005/0066095 | A1 * | 3/2005 | Mullick et al. | 710/200 |
| 2005/0114297 | A1 * | 5/2005 | Edwards | 707/1 |
| 2005/0187990 | A1 * | 8/2005 | Pace et al. | 707/204 |
| 2006/0048002 | A1 * | 3/2006 | Kodi et al. | 714/13 |
| 2006/0075294 | A1 * | 4/2006 | Ma et al. | 714/13 |
| 2006/0112151 | A1 * | 5/2006 | Manley et al. | 707/201 |
| 2006/0129610 | A1 * | 6/2006 | Agarwal et al. | 707/202 |
| 2006/0136526 | A1 * | 6/2006 | Childress et al. | 707/205 |
| 2006/0184587 | A1 * | 8/2006 | Federwisch et al. | 707/200 |
| 2006/0206536 | A1 * | 9/2006 | Sawdon et al. | 707/200 |
| 2006/0218135 | A1 * | 9/2006 | Bisson et al. | 707/4 |
| 2006/0242489 | A1 * | 10/2006 | Brockway et al. | 714/718 |
| 2007/0011137 | A1 * | 1/2007 | Kodama | 707/1 |
| 2007/0083722 | A1 * | 4/2007 | Per et al. | 711/162 |
| 2007/0094269 | A1 * | 4/2007 | Mikesell et al. | 707/10 |
| 2007/0094533 | A1 * | 4/2007 | Coombs et al. | 714/6 |

* cited by examiner

*Primary Examiner*—Scott T Baderman
*Assistant Examiner*—Chae Ko
(74) *Attorney, Agent, or Firm*—Krishnendu Gupta; Joseph D'Angelo (57) ABSTRACT

A method and apparatus for performing incremental file system checks is described which uses file system information to identify changes that have occurred to a file system between checkpoints. The set of changes can be represented by bitmaps and data structures which may be used by file system check utilities to identify potential errors and to remedy these errors if appropriate. Verifying only file system changes greatly reduces the processing overhead associated with typical backup and recovery mechanisms.

20 Claims, 7 Drawing Sheets

SYSTEM FOR PERFORMING INCREMENTAL FILE SYSTEM CHECK

FIELD OF THE INVENTION

This invention is related generally to the field of file systems and more particularly to a method and apparatus for increasing file server performance by reducing delays associated with file system backup and recovery.

BACKGROUND OF THE INVENTION

In network environments where high-availability is a necessity, system administrators are constantly faced with the challenges of preserving data integrity and ensuring availability of critical system components. One critical system component in any computer processing system is its file system. File systems include software programs and data structures which define the use of underlying data storage devices. File systems are responsible for organizing disk sectors into files and directories and keeping track of which sectors belong to which file and which are not being used.

The accuracy and consistency of a file system is necessary to relate applications and data. However, there always exists the potential for data corruption in any computer system and therefore measures are taken to periodically save or back up file server state to allow system recovery in the event of faults or failures.

One method for backing up a file system to collect verified snapshots ('snaps') of a consistent file system, and to store the snaps as file system checkpoints. When data corruption is detected, one of the checkpoints can be used for file system recovery.

The checkpoint should be verified for accuracy and consistency prior to storage and/or recovery or restore. File system verification may be performed via a 'file system check' (fsck) utility. A variety of operations are performed during fsck; for example file system directory structures and block counts are checked for consistency and data values may be checked for accuracy. The fsck utility is a time consuming task; depending upon the size of the file system, it may take hours to perform because the time required to perform a file system check is generally time linear to the size of data within the file system. Thus, as an increasing number of file system checkpoints are saved, significant processing capability is used to perform fsck on checkpoints which may never be used.

SUMMARY OF THE INVENTION

According to one aspect of the invention, a method for storing a verified checkpoint of a file system includes the steps of capturing a new file system checkpoint, and comparing data structures of the new file system checkpoint to data structures in an old file system checkpoint to identify changes that have occurred to the file system between a first point in time and a second point in time; and verifying the new file system checkpoint by performing file system checks only on the identified changes to the file system.

According to anther aspect of the invention, a file server comprising a computer readable medium having program code stored thereon for managing a file system is provided. The program code is operable when executed to periodically make checkpoint copies of the file system and to verify the checkpoint copies by performing file system check operations only on incremental changes to the file system which occur during successive pairs of checkpoints.

With such an arrangement, an incremental scan process is provided that verifies only changes that are made to the file system between checkpoints. As a result the time needed to perform file system checks can be greatly reduced, and the overall performance of the file server may be increased.

These and other advantages of the present invention will be described with reference to the attached figures, which describe:

DETAILED DESCRIPTION

The present invention is directed towards an apparatus and method for increasing file server performance by decreasing the amount of time that is used to verify file system accuracy and consistency. A mechanism is provided for identifying only those blocks that have changed between any two snapshots. A list of changed inodes is generated, and traditional accuracy and coherency checks may be performed only on blocks associated with inodes in the changed inode list, rather than on the entire file system. As a result, file server performance is greatly increased by reducing the processing overhead associated with maintaining file system backups. Any saved checkpoint may be used to restore the file system in the event of corruption.

Figure 1:
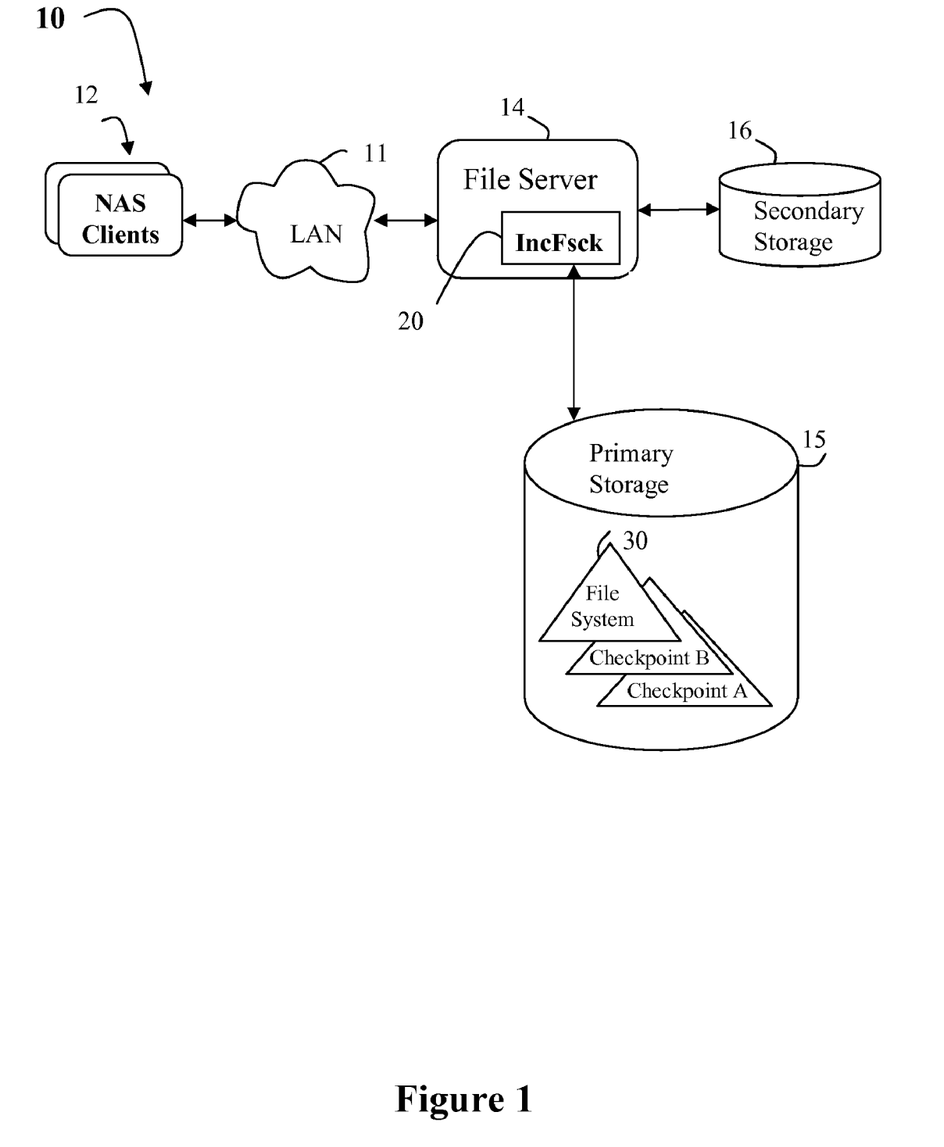
FIG. 1 is a block diagram of a storage system including incremental file system check capabilities of the present invention.

An exemplary Network Attached Storage (NAS) system 10 in which the present invention may be employed is shown in FIG. 1. One or more NAS clients such as clients 12 and 18 are coupled via a Local Area Network (LAN) 11 to NAS file server 14. File server 14 has its own network address and may be accessed using a variety of network protocols, including but not limited to the Network File System (NFS) protocol of Sun Microsystems™ and the Common Internet File System (CIFS) provided by Microsoft Systems™. An exemplary NAS device that may be used for primary storage 14 is any Celerra product provided by EMC Corporation of Hopkinton Mass.

File server 14 controls the access and retrieval of data from attached storage devices such as primary storage 15 and secondary storage 16. The file server is a computer on which a user can map or mount a drive or directory so that the directory appears to be on the machine at which the user is sitting. Additionally, the user can read or write a file as though it were part of the filesystem of the user's computer.

Figure 2:
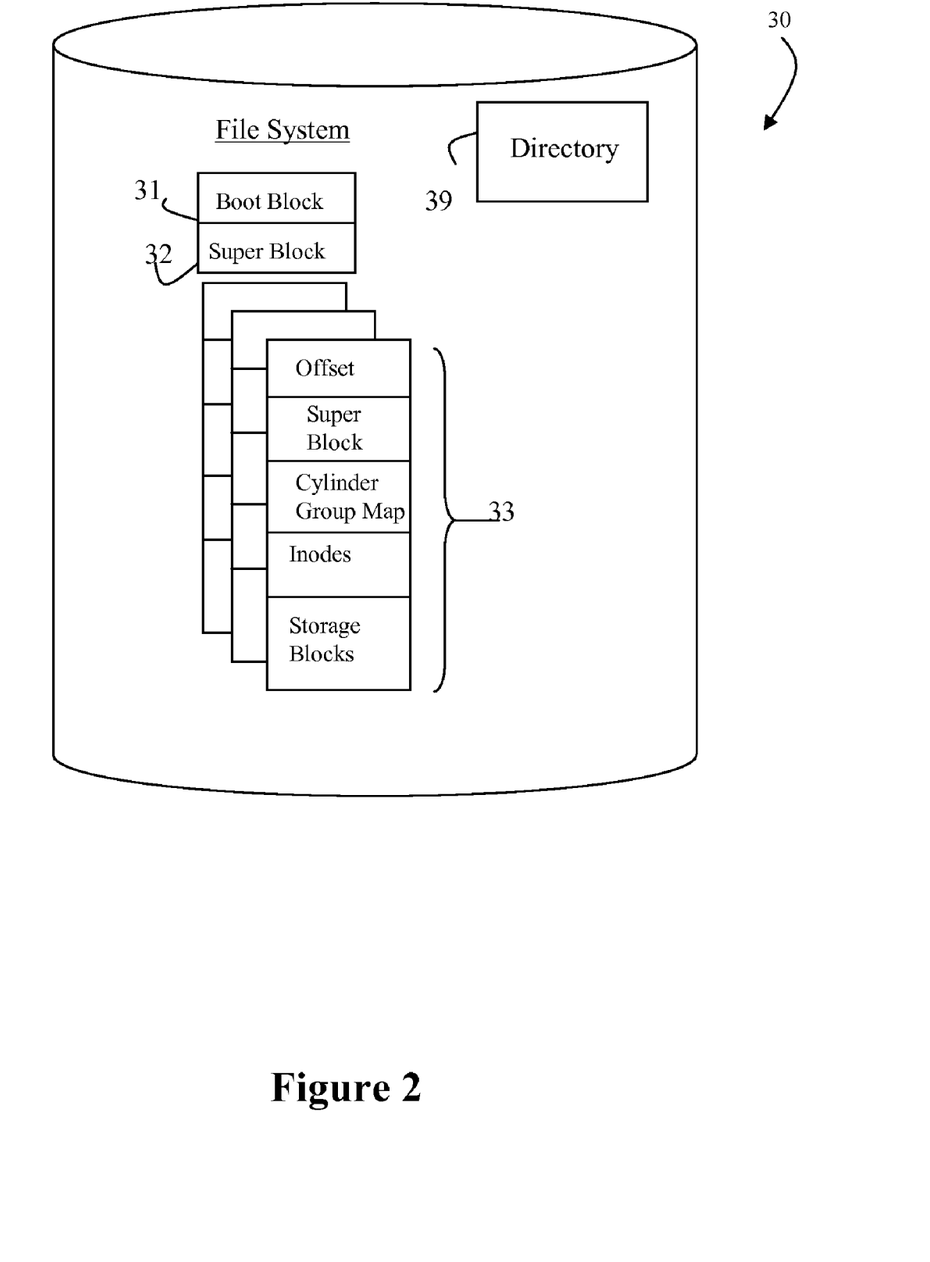
FIG. 2 illustrates exemplary components of a file system.

The filesystem 30 defines the use of data storage devices that offer access to an array of fixed-size blocks, or sectors. The file system software is responsible for organizing these sectors into files and directories, and keeping track of which sectors belong to which file and which are not being used. FIG. 2 illustrates a file system in more detail. In FIG. 2, a typical file system 30 is composed of a group of boot blocks 31, a superblock 32 and a collection of cylinder groups (CGs) 33. The boot block stores code which is used to initialize the file system. The superblock stores statistical, geometric and behavioral tuning parameters associated with the file system. Each cylinder group (CG) has the following components: a backup copy of the superblock, a CG block which stores information to the particular cylinder, a collection of inode data structures that store metadata associated with the cylinder group data blocks, and the cylinder group data blocks. Each CG block entry includes a first portion characterizing the state of the associated cylinder, and a second portion including the cylinder group header of the associated cylinder. The state of the associated cylinder may include a cylinder group number, the block number within the cylinder where the cylinder block resides, state and other cylinder group counters. The cylinder group header stores attribute and inode information for the cylinder, and will generally vary in size from one file system to another based on the inode density of the cylinder group. The cylinder group header may include a dirty counter which tracks the usage of the blocks for each cylinder.

The NAS system of FIG. 1 is also shown to include secondary storage 16. In general the secondary storage includes fewer features and/or operates at a lower performance than primary storage. The selection of a storage device for the secondary storage 16 is a matter of design choice, depending upon the business needs, perceived value and associated protection levels to be afforded to off-line data. For example, a storage platform selected from EMC's Centera™ product family may be used to provide secondary storage. Secondary storage is used to store archived and other infrequently accessed data. In some systems, secondary storage may be used to store backup copies of the file system.

Primary and/or secondary storage may be used to store one or more snapshots (snaps), or 'checkpoints' of the file system. If a failure or a corruption impacts an application's data the application can be re-started using one of the point-in-time checkpoints. The checkpoint may be a clone of the file system, a mirror of the file system or a snapshot of the file system. Both the clone and mirrors of the file system use a large amount of space. However, a snap-shots use pointers to the production copy and physically copy only the data that changes, using less capacity than a full clone or mirrored copy. The present invention may work with any type of checkpoint.

As shown in FIG. 1 there may be multiple checkpoints of a file system. In the event of data corruption or failure one of the checkpoints will be relied on for restoration purposes. It is essential that the accuracy and the consistency of the selected checkpoint be verified. According to one aspect of the invention, an incremental file system check (IncFsck) is executed for each checkpoint. The incremental file system check verifies changes to the file system state that have occurred since a previously verified checkpoint. Accordingly, the present invention greatly reduces the time used for file system verification by making the verification time proportional to the number of changes in the file system, rather than the number of files in the file system.

In various embodiments the present invention identifies changes that have occurred to data blocks between successive checkpoints using a variety of file system data including inode data, cylinder group maps and summary information. Once changed data blocks have been identified, traditional fsck operations such as verifying directory, link and summary information can be performed to verify the accuracy and coherency of the new checkpoint.

Figure 3:
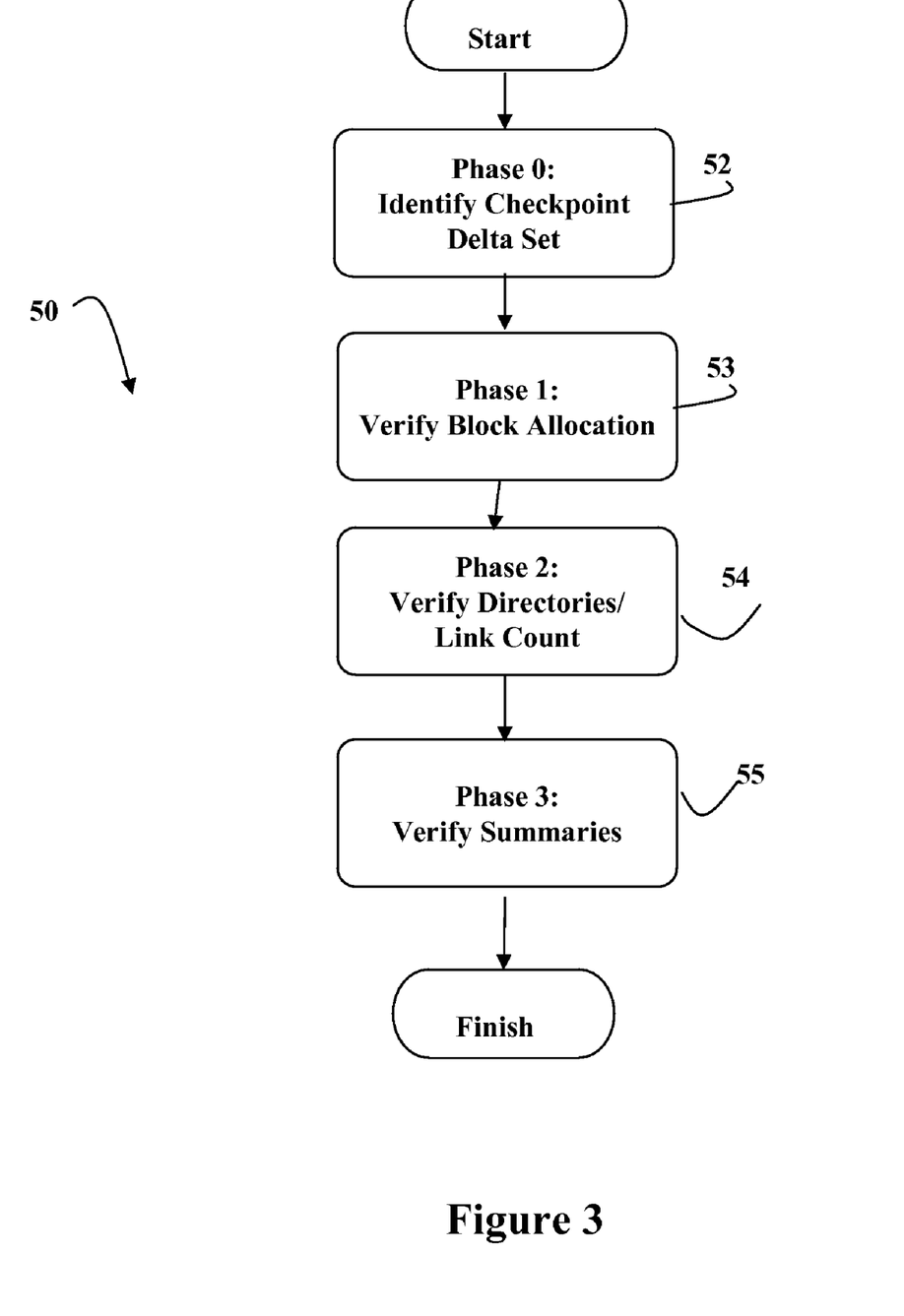
FIG. 3 is a flow diagram illustrating several phases in one embodiment of an incremental file system check process of the present invention.

FIG. 3 is a flow diagram provided to illustrate several phases of an incremental file system check process 50 of the present invention. An incremental file system check may be conceptually delineated into three operative phases; phase one (52) identifies inode data that has been modified since the last checkpoint, a block check phase (53) that verifies block allocation, a phase two (54) verifies directories and link counts and a phase three (56) verifies file system summary data. In essence, phase one identifies the changes between the point in time copies, and phases 3 and 4 serve to validate the changes, merging any updates obtained by the verification back into the new checkpoint. Each of these phases will be described below in more detail. It should be noted that although exemplary methods for implementing phase two and phase three will be described, the present invention is not limited to any process that includes these operations.

Figure 4:
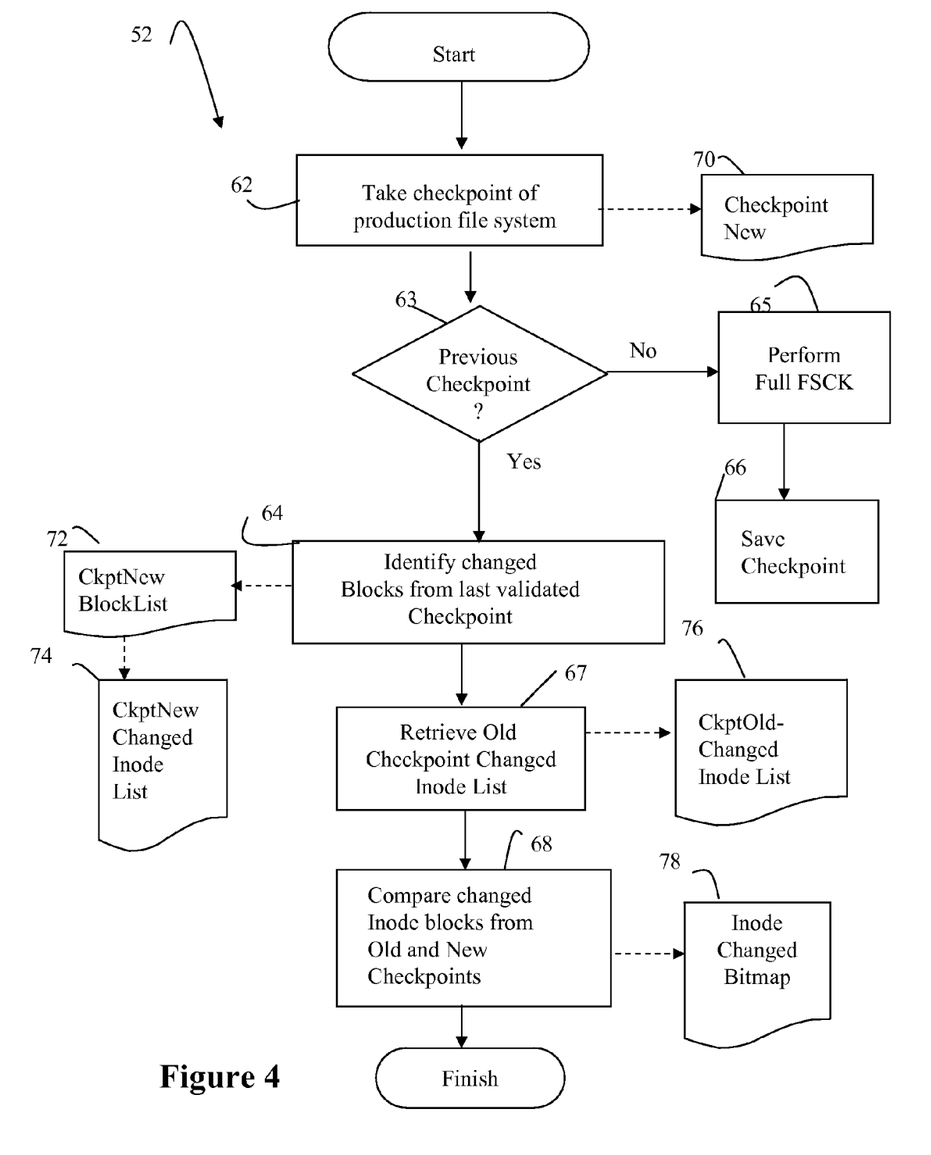
FIG. 4 is a flow diagram illustrating exemplary steps and data structures that may be used and performed during a phase one process which compared checkpoints to identify differences, or deltas, in the checkpoints.

FIG. 4 is a flow diagram illustrating several exemplary steps that may be performed to identify modified inodes between checkpoints. FIG. 4 also illustrates several data structures that are generated during the inode identification process of phase 0.

At step 60, a snapshot of the production file system (i.e., currently operating file system) is obtained and saved as Checkpoint New (ckptNew) 70. At step 63 it is determined whether there is a previous checkpoint. If not, the process goes to steps 65 and 66 where a full FSK is performed and the checkpoint is saved. If at step 63 there was no previous checkpoint, then at step 64 the checkpoint is evaluated to identify blocks that have changed since the last checkpoint. This can be performed in a variety of ways. For example, inode meta-data may be evaluated on a time wise basis to identify those inodes having changed meta-data since a selected point in time. The inodes having meta-data changes may be indicated in a meta-data bitmap stored with every snap, for example in the savVolume. Alternatively, a block bit map that is re-initialized following each checkpoint may be updated in between checkpoints to indicate which data blocks were accessed. The block bit map may be stored with the checkpoint, and thus provides a straightforward method of identifying changed data blocks. Cylinder Group Header Dirty counter information may be used. Alternatively, the cylinder group bitmaps of an old and new checkpoint may be compared to identify newly added or deleted blocks. Accordingly it can be seen that there are a variety of techniques which can be used to identify which blocks have been modified since the last checkpoint, and the present invention is not limited to any particular detection technique. Whichever technique is used, a changed block list 72 is generated, which identifies each block that has been modified since the selected point in time in the new Checkpoint. The changed block list may include a pointer to an Inode associated with the block. A CkptNew change Inode list 74 is generated based Inode information from the changed block list.

At step 67 the changed inodes from the old checkpoint are determined and stored as CkptOld Inode list 76 to limit the scope of checks within the change range. At step 68, the lists of changed Inode blocks from both ckptNew and ckptOld, are compared and used to construct Inode Changed bitmap 78, which will include both deleted and newly created inodes.

Figure 5A:
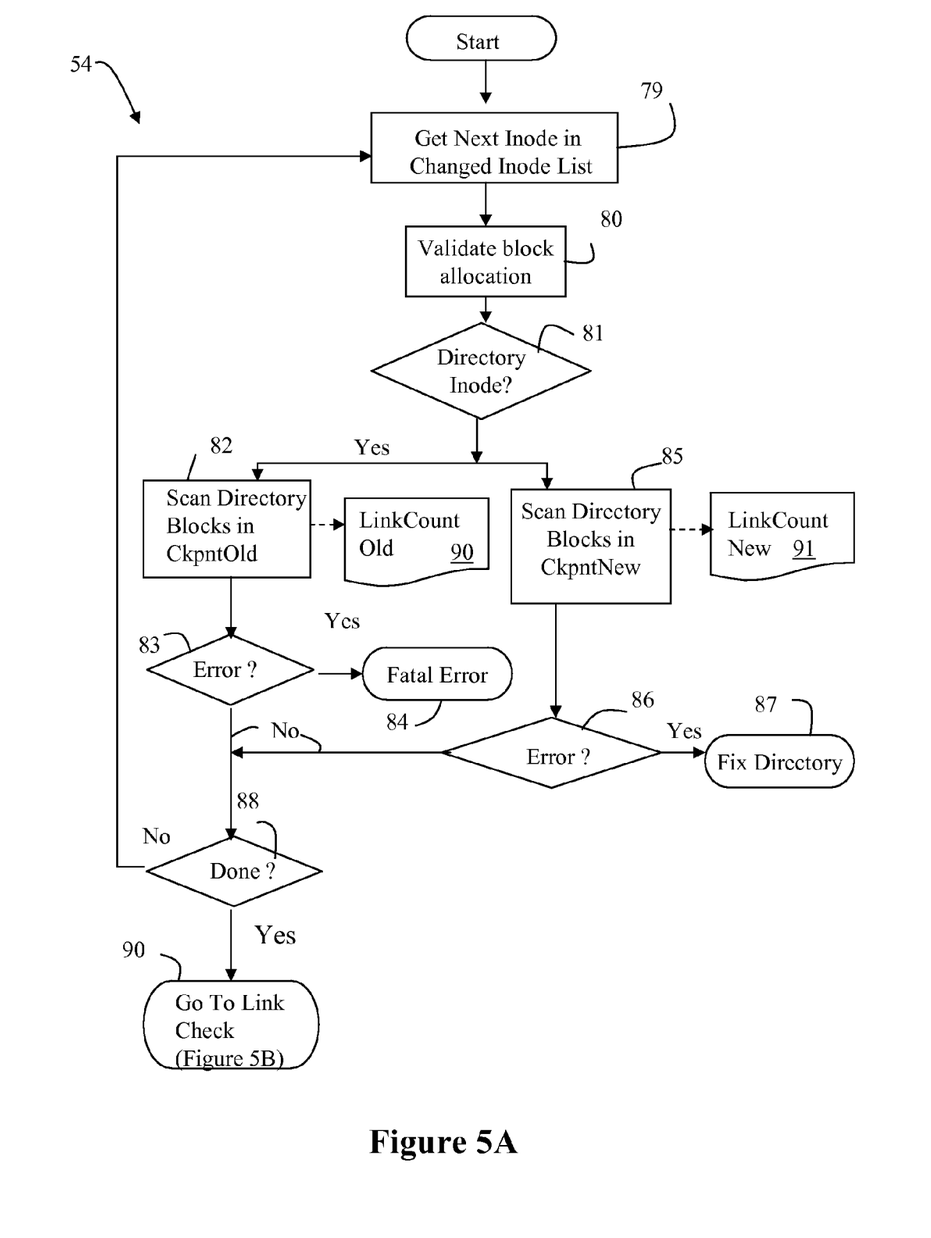
FIGS. 5A and 5B are a flow diagram illustrating exemplary steps and data structures that may be used and performed during a directory and link verification phase of the present invention.
Figure 5B:
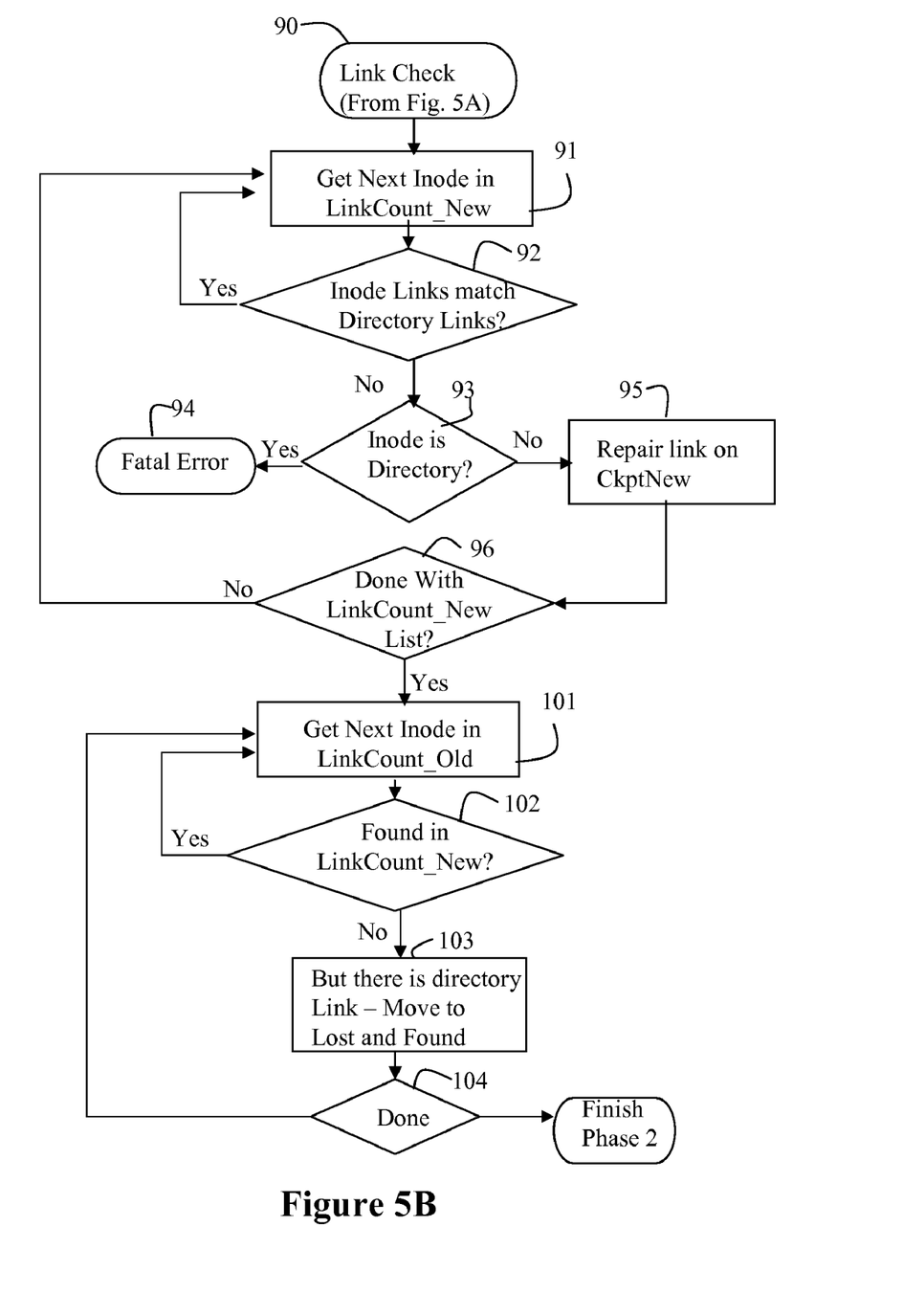
Figure 6:
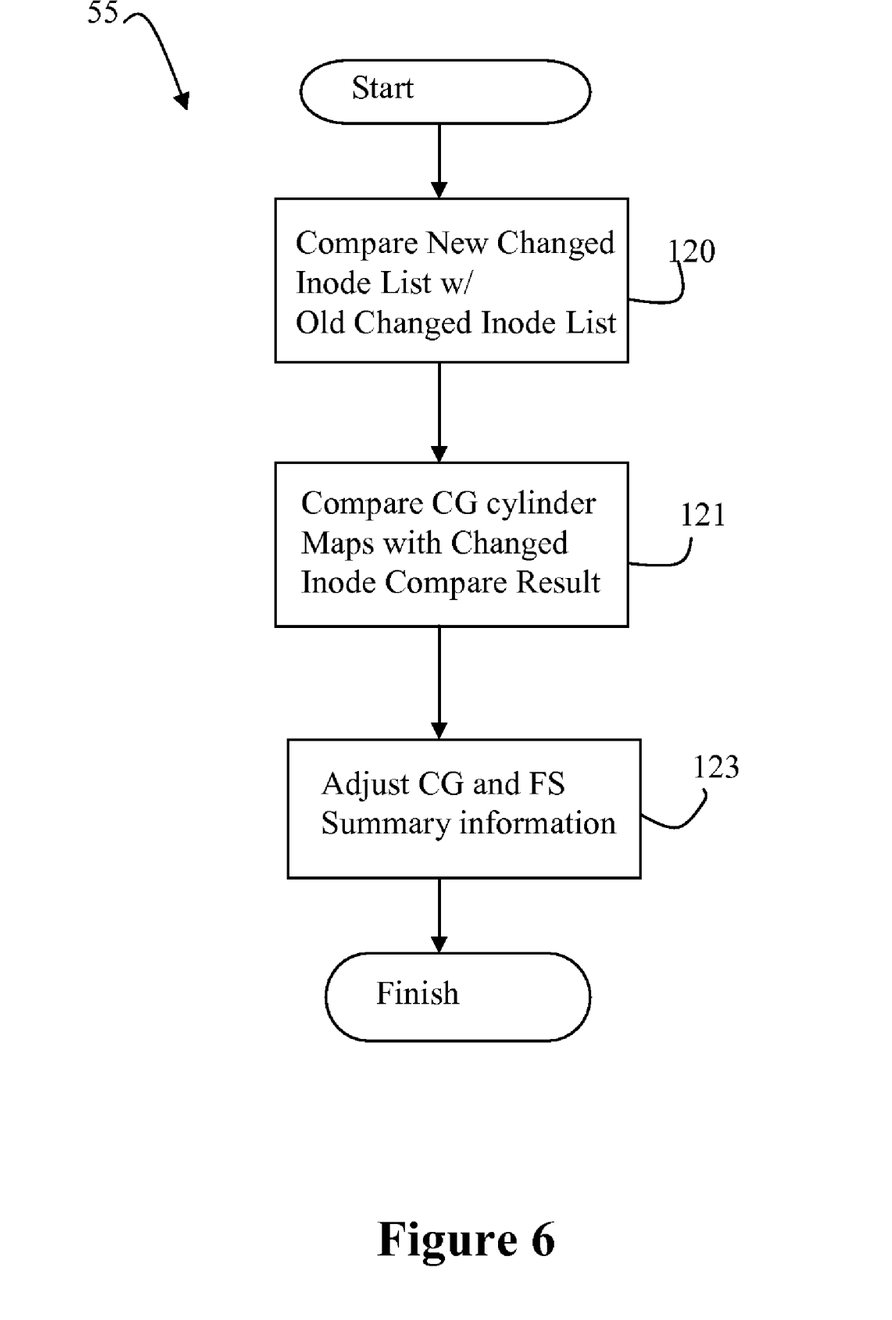
FIG. 6 is a flow diagram illustrating exemplary steps that may be performed during a file system checkpoint summary phase of the present invention.

The Inode Changed bitmap 78 is used by file system checking logic to systematically evaluate the accuracy and consistency of changed blocks, for example using the processes of FIGS. 5A and 5B and 6. FIG. 5 illustrates exemplary steps that may be performed during a phase 2 process 54 to verify directories and link counts.

At step 79 the next Inode is identified at step 80 a block allocation is verified. At step 81 if the inode is a directory inode the process proceeds to step 82 verification of the links is performed. At step 82 the directory blocks in ckptOld 74 are scanned, and links to its immediate children are stored in a data structure linkCount_old. If at step 83 there is an error reading a directory or an inconsistency (for example referencing a free inode), the process exits with Fatal error at step 84.

At step 85, each directory in CkptNew InodeChanged list 74 is evaluated and links are recorded in linkCount_new. If at step 86 an error such as a reading directory or inconsistency between the inodes links and the directory is detected, the contents of the directory are updated at 87. The process of verifying the new checkpoint's directory continues until each directory in CkptNew Inode Changed has been handled.

At step 90 the process begins a verification of directory/file links at FIG. 5B. At steps 91 and 92 a traversal of the Link-Count_New list is initiated to identify a mismatch between links and directories. If at step 92 there is a mismatch, then if the inode is a directory inode, the process goes to Fatal Error 94. If the mismatch is not an inode directory at step 95 the link is repaired in CkptNew. The process continues until the Link-Count_New list has been traversed.

Step 101 begins the traversal of the link count of the old checkpoint (LinkCount_Old). At step 102 the LinkCount_Old and LinkCount_New lists are compared. If a link is encountered which is not known in the new checkpoint, but the directory information is not consistent with the new directory checkpoint, the link is moved to lost and found. This continues until both lists have been compared.

FIG. 6 illustrates several steps that may be performed in a third phase of file ystem validation. At step 120, for each of the old and new checkpoints, each inode in the respective Changed Inode list are compared to identify deletions and creations of inodes. At step 122 the cylinder group block bitmap is verified to see if all the deletions and creations are captured by cylinder group bits. At step 123 cylinder group and file summary files are updated for accuracy.

Accordingly a method and apparatus for performing incremental file system checks has been shown and described which uses file system information to identify changes that have occurred to a file system between checkpoints. The set of changes can be represented by bitmaps and data structures which may be used by file system check utilities to identify potential errors and to remedy these errors if appropriate. Although certain data structures and bitmaps have been disclosed herein, it is appreciated that there are many different ways of obtaining the information, and different data structures or bitmaps which serve the same purpose may be substituted herein without affecting the scope of the present invention.

The processes that execute phase 0, 1 and 2 may be part of a checkpoint software program operating on the file server. It is appreciated that such a program may have user settable attributes, such as the ability to over-ride incremental checkpoints to perform a full checkpoint if a threshold condition is met.

As has been shown above, the data structures of the present invention may be used to identify a variety of errors between checkpoints, including summary counter mismatch, indirect and directory block corruptions, duplicate allocation, inode corruptions, file link count mismatch, cylinder group mismatch and more. The information of the present invention may also be used to identify errors outside merely those indicated by the delta between the old and new checkpoint; for example, duplicate block allocation with one file outside of the delta may be detected, directory link count mismatches may be detected and base checkpoint I/O or other validation errors may further be identified.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method for storing a verified checkpoint of a file system, the method comprising:
   capturing a new unverified checkpoint of the file system;
   comparing data structures of the new unverified checkpoint of the file system to data structures in an old previously verified checkpoint of the file system to identify changes that have occurred to the file system between a first verified point in time and a second unverified point in time;
   creating a captured checkpoint identified changes, based on the comparing; and
   validating the unverified checkpoint of the file system to make it a second verified checkpoint of the file system by using the captured checkpoint identified changes to verify the second checkpoint of the file system by performing file system checks only on the captured checkpoint identified changes which represents identified changes to the file system.

2. The method of claim 1 wherein the new checkpoint is a new copy of the file system at the first point in time and the old checkpoint is a second copy of the file system at the earlier point in time.

3. The method of claim 1 wherein the step of comparing data structures includes the steps of:
   generating an mode list identifying modes having properties that differ between the new checkpoint and the old checkpoint; and
   generating the verified checkpoint by executing a file system check utility on the modes in the mode list.

4. The method of claim 3 wherein the step of generating an mode list includes the steps of comparing cylinder group information of each of the new and old checkpoints.

5. The method of claim 3 wherein the step of generating an mode list includes the steps of:
   identifying changed blocks in the new checkpoint;
   providing a new checkpoint changed mode list using the identified changed blocks.

6. The method of claim 5 further including the steps of identifying changed modes in the old checkpoint to provide an old checkpoint changed mode list.

7. The method of claim 6 further including the step of merging the new checkpoint changed mode list and the old checkpoint changed mode list to generate the mode list.

8. The method of claim 1 wherein the step of verifying includes the steps of
   identifying changed blocks in the old checkpoint; and
   generating the mode list in response to the identified changed blocks.

9. The method of claim 4 wherein the step of identifying the changed blocks includes the steps of comparing bitmaps in each of the first and second checkpoints.

10. The method of claim 1 wherein the step of comparing generates a delta set of mode structures and wherein the step of verifying verifies directory accuracy of the delta set.

11. The method of claim 10 wherein the step of verifying verifies mode directory links in the delta set.

12. The method of claim 10 wherein the step of verifying verifies summary information of the new checkpoint using the delta set.

13. The method of claim 1 wherein the file check performed is fsck.

14. The method of claim 1 wherein the file system is "write-in place".

15. The method of claim 1 wherein the verification comprises:
   identifying any inodes that have been modified in the captured checkpoint identified changes;
   verifying the block allocation in the captured checkpoint identified changes;
   verifying directory and link count in the captured checkpoint identified changes;
   verifying the file system summary data in the captured checkpoint identified changes.

16. The method of claim 15 further comprising:
   merging any updates obtained by the verification into the unverified checkpoint to create the verified checkpoint.

17. The method of claim 9 wherein each bitmap of the bitmaps in each of the first and second checkpoints represents a bitmap that tracks the blocks that were accessed since the creation of the previous checkpoint.

18. The method of claim 1 wherein the creating a captured checkpoint identified changes, based on the comparing comprises:
   creating a changed block list indicating each block that has been modified between the verified checkpoint and the unverified checkpoint;
   determining the changed modes from the verified checkpoint using the changed block list;
   determining the changed modes from the unverified checkpoint using the changed block list; and
   constructing an mode changed list based on a comparison of the changed modes from the verified checkpoint and changed modes from the unverified checkpoint.

19. A file server comprising a non-transitory computer readable storage medium having program code stored thereon for managing a file system, the program code operable when executed to:
   periodically make unverified checkpoint copies of the file system; and
   verify the checkpoint copies of the file system until all checkpoints are verified by executing a verification method using a verified checkpoint of the file system and the unverified checkpoint copies of the file system, the verification method comprising:
   creating a captured checkpoint identified changes, based on a comparison of a verified checkpoint of the file system and a first of the checkpoint copies of the file system;
   performing file system check operations only on the captured checkpoint identified changes corresponding to incremental changes to the file system;
   verifying the first of the checkpoint copies of the file system, based on the file system check operations, to make the first of the checkpoint copies of the file system a second verified checkpoint of the file system;
   removing the first of the checkpoint copies of the file system corresponding to the second verified checkpoint of the files system from the checkpoint list; and
   if the verified checkpoint list is not empty, further verifying the checkpoint copies of the file system by executing the verification method using the second verified checkpoint of the file system as the verified checkpoint of the file system and the unverified checkpoint copies of the file system.

20. The file server comprising the non-transitory computer readable storage medium of claim 19 wherein the program code is further operable to:
   compare checkpoint copies of file system; and
   generate bit maps associated with changes in state between pairs of checkpoints.

* * * * *